(12) United States Patent
Ryman

(10) Patent No.: US 12,276,362 B2
(45) Date of Patent: Apr. 15, 2025

(54) QUICK CONNECTOR MADE OF PLASTICS

(71) Applicant: Oetiker Schweiz AG, Horgen (CH)

(72) Inventor: Morgan Ryman, Anderstorp (SE)

(73) Assignee: Oetiker Schweiz AG, Horgen (CH)

( * ) Notice: Subject to any disclaimer, the term of this patent is extended or adjusted under 35 U.S.C. 154(b) by 0 days.

(21) Appl. No.: 18/286,778

(22) PCT Filed: Apr. 15, 2021

(86) PCT No.: PCT/EP2021/059823
§ 371 (c)(1),
(2) Date: Oct. 13, 2023

(87) PCT Pub. No.: WO2022/218533
PCT Pub. Date: Oct. 20, 2022

(65) Prior Publication Data
US 2024/0183475 A1  Jun. 6, 2024

(51) Int. Cl.
*F16L 37/098* (2006.01)
(52) U.S. Cl.
CPC .................. *F16L 37/0982* (2013.01)
(58) Field of Classification Search
CPC .... F16L 37/0982; F16L 37/088; F16L 37/091
USPC .......... 285/314, 315, 316, 321, 340
See application file for complete search history.

(56) References Cited

U.S. PATENT DOCUMENTS

| 3,204,988 | A | * | 9/1965 | Dunton ................. | F16L 37/091 |
| | | | | | 285/423 |
| 3,922,011 | A | * | 11/1975 | Walters ................. | F16L 37/088 |
| | | | | | 285/902 |
| 4,538,679 | A | | 9/1985 | Hoskins et al. | |
| 4,747,626 | A | * | 5/1988 | Hama ................. | F16L 37/0915 |
| | | | | | 285/340 |
| 5,692,784 | A | * | 12/1997 | Hama ................. | F16L 37/0915 |
| | | | | | 285/308 |
| 9,429,262 | B2 | * | 8/2016 | Ericksen ............... | F16L 37/091 |

(Continued)

FOREIGN PATENT DOCUMENTS

DE  102015000990 B4  8/2016
EP      1104530 B1   8/2004

(Continued)

OTHER PUBLICATIONS

International Search Report and Written Opinion for PCCT/EP2021/059823, filed Apr. 15, 2021.

*Primary Examiner* — David Bochna
(74) *Attorney, Agent, or Firm* — David L. Nocilly; Bond Schoeneck & King PLLC

(57) ABSTRACT

A quick connector made of plastics material for establishing a snapping connection between a tubular male part (50) and a female part (40; 40A) of a fluid connection system. The connector has a retainer (10) adapted to be set within the mouth portion (41; 41A) of the female part (40; 40A) and having first and second flexing members (11, 12) for snapping engagement with the male part (50) and the female part (40; 40A), respectively. Each pair of circumferentially adjacent first and second flexing members (11, 12) is cross-connected by a transversal web portion (13) having a main longitudinal axis (L) which extends directly from the first flexing member (11) to the second flexing member (12).

15 Claims, 4 Drawing Sheets

(56) References Cited

U.S. PATENT DOCUMENTS

2008/0100062 A1* 5/2008 Aston .................. F16L 37/091
                                                           285/321
2015/0145249 A1* 5/2015 Taneya ................. F16L 37/091
                                                           285/340

FOREIGN PATENT DOCUMENTS

| EP | 1682810 | B1 | 5/2008 |
| EP | 1549873 | B1 | 12/2010 |
| EP | 3508769 | A1 | 7/2019 |
| EP | 3097335 | B1 | 1/2020 |
| RU | 2742514 | C1 | 2/2021 |

* cited by examiner

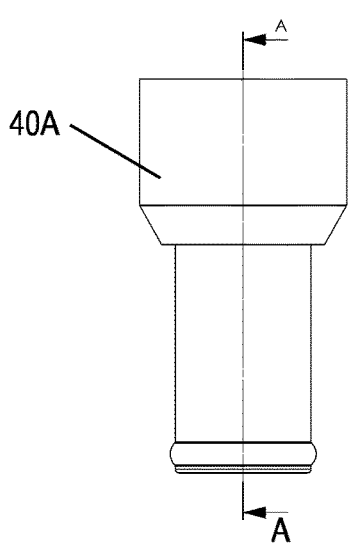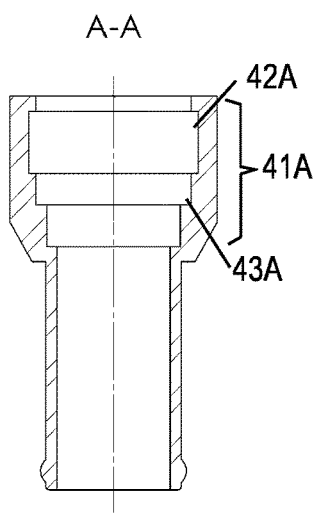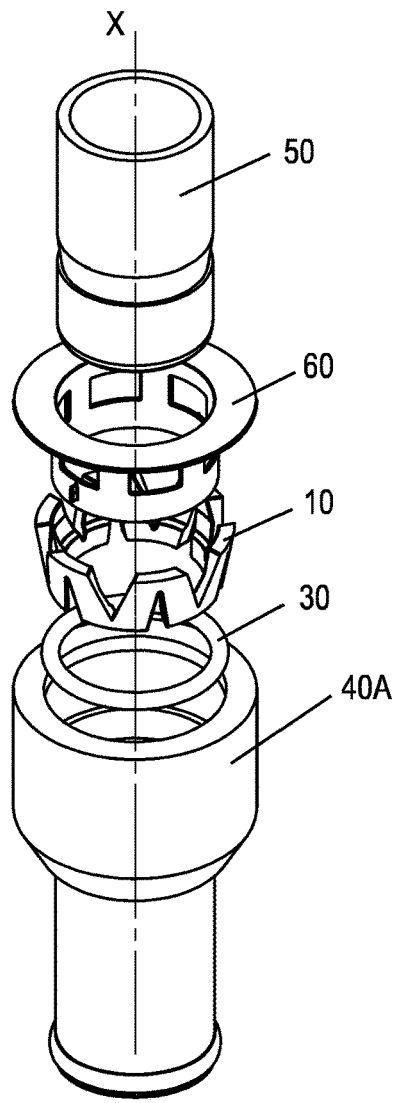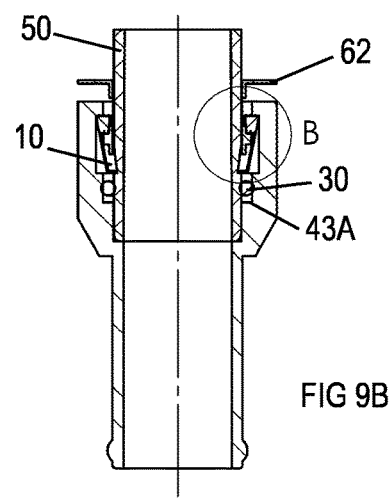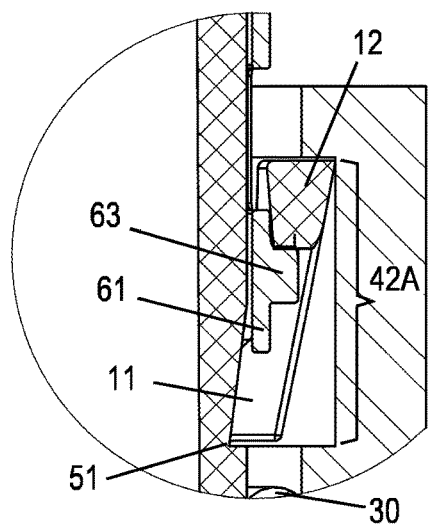
FIG 8A
FIG 8B
FIG 9A
FIG 9B
FIG 9C

QUICK CONNECTOR MADE OF PLASTICS

CROSS-REFERENCE TO RELATED APPLICATIONS

The present application is a US national stage application of International Application No. PCT/EP2021/059823, filed on Apr. 15, 2021.

BACKGROUND OF THE INVENTION

Quick connectors (also called snap connectors) are widely used for allowing easy connection between a male part, such as a pipe socket, spigot or nipple, and a female part, particularly a hole portion in a block part of a fluid conducting system or a tube end.

EP 1 104 530 B1 and EP 1 682 810 B1 disclose conventional quick connectors made of plastics. The connectors have first tongue portions protruding radially inwards for snapping engagement with the male part and second tongue portions protruding radially outwards for snapping engagement with the female part. Those conventional quick connectors have a constructional setup which is relatively complex and prone to damages. Indeed, the first and second tongue portions are connected to a ring-shaped base portion only by small webs which serve as hinge-joints for the flexing of the tongue portions. Those small web portions may break after a predetermined number of flexing operations or due to a fatigue of material. Further, the first and second tongue portions are provided at axially spaced portions of the connector so that the connector has a quite long axial extension.

SUMMARY OF THE INVENTION

The object of the present invention is to reduce the weight and cost of the connector, to simplify its constructional setup and manufacturing effort, to shorten its axial extension and to improve its resistance against fracture even for long term use and repeated operations of its flexing parts.

The object is met by the quick connector defined in present claim 1. The dependent claims relate to preferred embodiments and additionally call for a connection system comprising the quick connector and the male and female parts to be connected with each other.

In accordance with the present invention, the quick connector comprises a retaining means which is to be set within the mouth portion of the female part and which comprises first and second flexing members provided at circumferentially spaced portions for snapping engagement with the female part and the male part, respectively. Unlike the conventional solutions of quick connectors made of plastics, each pair of circumferentially adjacent first and second flexing members is interconnected by a web portion having a main longitudinal axis which extends directly from the first flexing member to the second flexing member. This simplifies the constructional setup and the manufacturing of the quick connector and allows to minimise the axial dimension thereof. Furthermore, the interconnection of adjacent first and second flexing members by the transversal web portions improves the radial resilience and decreases the risk of fracture even under long-term use.

According to a preferred embodiment of the present invention, the first flexing members are provided at a first axial end of the retaining means, and the second flexing members are provided at a second axial end of the retaining means which is opposite to the first axial end. The retaining means as a whole has the shape of a tapered ring whose diameter reduces from the second axial end to the first axial end, and which is provided with radial resilience by first gaps provided at the first axial end between two circumferentially adjacent first flexing members and second gaps provided at the second axial end between two circumferentially adjacent second flexing members.

The overall shape of the retaining means may have n-fold symmetry, n being an integer, wherein n=6 in the most preferred embodiment.

The web portions connect the first and second flexing members in a zig-zag shape along the circumferential direction of the retaining means. Hence, the overall shape of the retaining means can also be described as a number (most preferably six) of V-shaped ring segments which are interconnected at their adjacent arms to form a crown.

According to a preferred embodiment of the invention, the main longitudinal axis of each web portion forms an inclination to the axial direction of the quick connector, said inclination being described by two angles: a first angle $\alpha$ giving the amount by which the web portion is inclined radially inwards from the second flexing member to the first flexing member, and a second angle $\beta$ giving the amount by which the web portion is inclined in a circumferential direction of the retaining means from a second flexing member to the circumferentially adjacent first flexing member. Preferably, the first angle $\alpha$ is between 5° and 30°, in particular between 10° and 20°, and the second angle $\beta$ is between 10° and 60°, in particular between 20° and 50° to reach a retaining means with good characteristics in terms of stability and flexibility.

The design of the crown-like retainer ring with the comparatively small tapering towards the axial direction results in that only a small insertion force is needed to push-in the male part. The inward angle of the flexing members is very low, but it is possible to use the full axial length of the retainer ring for the inserting process of the male part during which the retainer ring as a whole has the possibility to expand in the radial direction. This in combination yields a required insertion force which is low but guarantees a high resistance force against pulling out the male part.

The front surface of the retaining means at the first axial end which comes next to the sealing means may be enlarged by web portions having a tapered form so that the width of the web portions reduces along the main longitudinal axis from the first flexing members to the second flexing members. This allows to enlarge the contact area between the first axial end of the retaining means and the sealing means or a washer optionally interposed between the retaining means and the sealing means.

Preferably, the retaining means is made of a polymer-based plastics material. It is particularly preferable to form the retaining means as an integral structural body by injecting moulding or the like from mouldable plastics material. Thereby, the production costs and the durability of the connector achieve most competitive values.

According to another preferred embodiment, the quick connector further comprises releasing means having a ring portion with an appropriate outer diameter to bend the first flexing members in the radial direction to be disengaged from the male part when the releasing means is pushed towards the lower (first) axial end of the retaining means. The pushing operation is alleviated by a gripping part which is connected to the ring portion and provided axially spaced therefrom so as to protrude from the mouth portion of the female part. Radial protrusions may be provided at the outer circumference of the ring portion to allow a latching engagement into a notch-like first gap between two adjacent first flexing members.

The sealing means, preferably an O-ring, an X-seal, or a lip seal, is positioned axially frontwards of the retaining means within the mouth portion of the female part. The sealing position does not axially overlap with the retaining means so that the sealing means is able to contact both the male part and the female part when the quick connector is in its locked condition. Thereby, one single sealing position is sufficient for the coupling between the male and female parts so that there is only one single potential leakage position.

BRIEF DESCRIPTION OF THE SEVERAL VIEWS OF THE DRAWINGS

Details of the invention and its embodiments will be explained with reference to the accompanying drawings. Therein shows:

FIG. 8A a side view of the female part according to a fifth embodiment of the present invention;

FIG. 8B a cross-sectional view taken along line A-A in FIG. 8A;

FIG. 9A a perspective exploded view of the fluid connection system according to the fifth embodiment of the present invention in a non-connected state;

FIG. 9B a cross-sectional view of the fluid connection system components of FIG. 9A in a connected state; and FIG. 9C an enlarged view of detail B in FIG. 9B.

DETAILED DESCRIPTION OF THE INVENTION

Figure 1A:
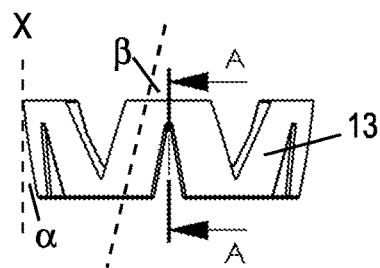
FIG. 1A a side view of the retaining means according to an embodiment of the present invention.
Figure 1B:
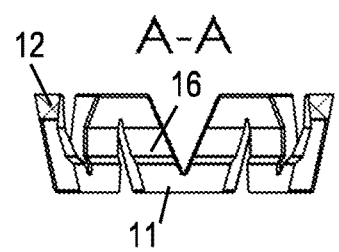
FIG. 1B a cross-sectional view of the retaining means taken along line A-A of FIG. 1A.
Figure 1C:
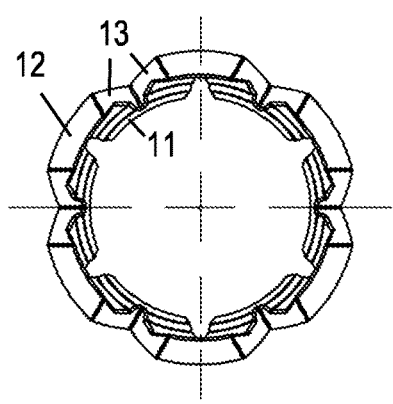
FIG. 1C a top view of the retaining means of FIG. 1A.
Figure 1D:
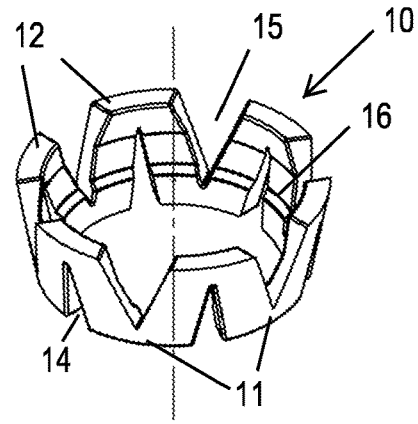
FIG. 1D a perspective view of the retaining means of FIG. 1A.

FIGS. 1A-1D show the retaining means 10 in different views. The shown retaining means 10 is made of plastics material, more specifically of a polymer-based plastics material, and is even more specifically obtained as an integral body by injection moulding or the like. The retaining means 10 has the overall shape of a tapered ring that has radial flexibility by a number of triangular gaps 14, 15 provided alternating on the first and second axial ends of the retaining means.

Due to the fact that the diameter of the ring-like retaining means increases from the first (lower) axial end to the second (upper) axial end, the rim portion of the retainer ring 10 at the upper portion protrudes radially outwards and the rim portion at the lower portion protrudes radially inwards. Due to the upper gaps 15 and the lower gaps 14 in combination with the general characteristics of the plastic material, the rim portions between the lower gaps 14 form first (lower) flexing members 11, and the rim portions between the upper gaps 15 form second (higher) flexing members 12. In other words, the first and second flexing members 11, 12 have elastic deformability in the radial direction, i.e. they can be flexibly deformed to a certain extent in a radial direction orthogonal to the axial extension X of the tubular retaining means 10.

Each pair of adjacent first and second flexing members 11, 12 is interconnected by a transversal web portion 13. Each web portion 13 is inclined with respect to the axial direction X, more specifically, the main longitudinal axis L of each web portion 13 cross-connecting a pair of adjacent first and second flexing members 11, 12 is inclined. The inclination may be described by two angles α and β. The first angle α specifies the amount of tapering of the retainer ring 10, i.e. the degree by which the outer diameter decreases from the second axial end to the first axial end. The second angle β specifies the amount of circumferential inclination of the transversal web portion 13, i.e. the amount by which the main longitudinal axis L of the web portion 13 deviates from a straight projection of the axial direction X to the (tapered) outer circumferential surface of the retainer ring 10.

In the shown embodiment, the inner surface of the web portions 13 is not flat but has a shoulder portion 16. This shoulder portion 16 serves as a rest for the lower axial end of the male part 50 in the non-connected state and for the ring portion 61 of a releasing means 60 in a connected state as will be described later on with respect to FIGS. 5-7 and 9. The shoulder portion 16 is merely an optional feature and the funnel-like inner surface of the web portions 13 may also be flat (just as the outer surface) providing the same performance of the retainer ring 10 in terms of radial resilience and stability.

In the shown embodiment, there are six first and six second flexing members 11, 12. Hence, the tubular retaining means 10 has a six-fold rotational symmetry and may be formed by interconnecting six V-shaped ring segments. However, solutions with more or less than six first and six second flexing members 11, 12 and even a deviation from the generally n-fold rotational symmetry are possible. In particular, there may be just two first second flexing members 11 and two second flexing members 12 cross-connected by just four web portions 13.

Figure 2A:
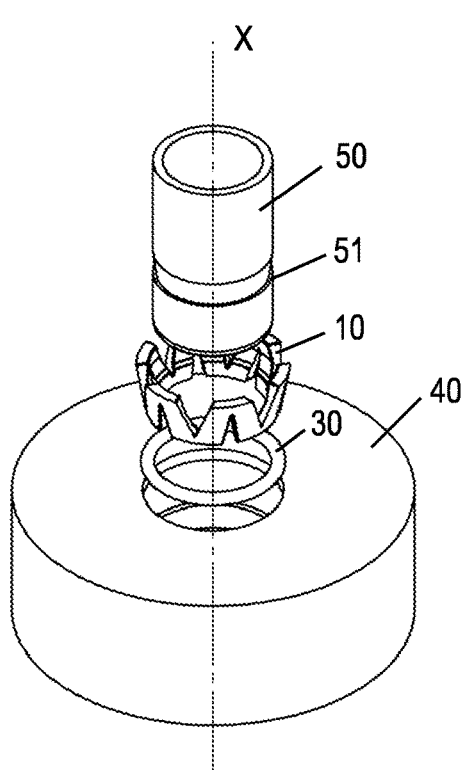
FIG. 2A a perspective exploded view of the quick connector and the female and male parts of the fluid connection system according to the first embodiment of the present invention in a non-connected state.
Figure 2B:
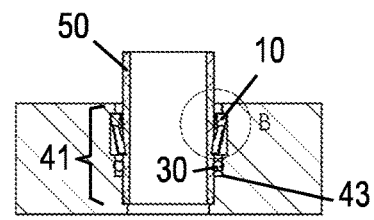
FIG. 2B a cross-sectional view of the fluid connection system components of FIG. 2A in a connected state.
Figure 2C:
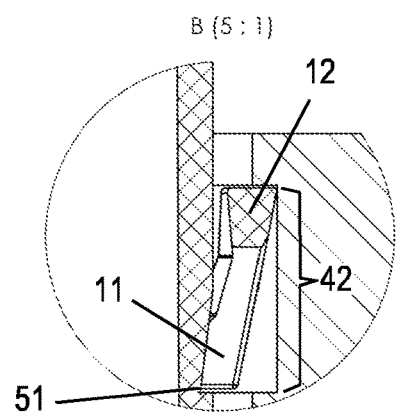
FIG. 2C an enlarged view of detail B in FIG. 2B.

In the perspective exploded view of present FIG. 2A, the retaining means 10 is shown in its pre-assembled state axially next to a sealing means 30 and in between the tubular male part 50 and the female part 40. The assembled position is shown in FIGS. 2B and 2C. Each of the cross-sectional views in FIGS. 2B, 3B, 6B, 7B and 9B is taken along the middle axis of two of the notch-like lower gaps 14 formed between two adjacent first flexing members 11.

In the perspective view of the fluid connection system shown in FIGS. 2A-2C, the female part 40 is formed as a hole in a block. While conventional fluid connection systems provided an inner threading in the hole for screwing a threaded portion of the connector, the mouth portion 41 of the female part 40 is adapted to fully receive and engage with the connector without such threaded portion. The inserting direction of the spigot 50 extends downwards in the Figure and is hereafter designated as the frontward direction. The opposite direction is designated as the backward direction.

The female part 40 has a mouth portion 41 which has a diameter large enough to receive the male part 50 encircled with the sealing means 30. The mouth portion 41 has a step portion 43 with increased diameter serving as an axial rest for the sealing means 30. Within the mouth portion 41 and spaced apart from the upper axial end thereof, the female part 40 has a recessed portion 42 having a larger diameter than the rest of the mouth portion 41. The axial length of the recessed portion 42 is about the same as the axial length of the retainer ring 10.

The diameter of the mouth portion 41 at the upper axial end is smaller than the outer diameter of the second flexing members 12 in their relaxed state. By pushing the retaining means 10 in the downward direction into the mouth portion 41, the second flexing members 12 will elastically deform radially inwards so that their outer diameter becomes small enough to enter the mouth portion 41. As soon as the second flexing members 12 will reach the axial position of a recessed portion 42 formed axially distant from the outer surface of the mouth portion 41, the second flexing members 12 will relax into their original state and snappingly engage with the groove-like recessed portion 42 of the female part 40.

The state in which the second flexing members 12 snap into the recessed portion 42 when the retaining means 10 is pushed in the frontward direction into the mouth portion 41 can be seen best in FIG. 2C. Since the second flexing members 12 then abut against the upper edge of the recessed portion 42, the retaining means 10 cannot be taken out from the mouth portion 41 anymore unless the second flexing members 12 are bent radially inwards.

Similarly, the male part 50 has a recessed portion 51 with a smaller outer diameter and spaced apart from the frontward axial end of the male part 50. The shaping of the male part 50 is shown in greater detail in FIGS. 4A-4D. When the male part 50 is pushed through the retainer ring 10 in the frontward direction, the first flexing members 11 snap into the recessed portion 51 as can be seen best in FIG. 2C. Hence, the first flexing members 11 abut against the upper edge of the recessed portion 51, and the male part 50 cannot be taken out from the retaining means 10 anymore without bending the first flexing members 11 radially outwards.

Thereby, the connection state shown in present FIGS. 2B and 2C is obtained, in which the sealing means 30 and the retaining means 10 reach a locked state and the retaining means 10 is engaged with the female part 40 by the snapping interaction between the second flexing members 12 and the recessed portion 42. As can be seen from present FIG. 2B, the retaining means 10 does not protrude axially from the female part 40 but is fully received within its mouth portion 41. This is of particular advantage for processing and delivering the female part 40 with the retaining means 10 in this pre-locked state. Further, the retaining means 10 stops the sealing means 30 from falling out of the mouth part 41 due to its locked axial positioning. The sealing means 30 rests at a step portion 43 of the female part 40. The step 43 has a larger diameter than the axially adjacent portion in the downward direction of the female part 40 so that the sealing means 30 cannot move further inward into the female part 40 either.

An O-ring 30 as the sealing means is to be positioned at the annular step 43 (see FIG. 2B) formed at the frontward region of the mouth portion 41. The O-ring 30 and the other parts of the connector are shown in FIG. 2A axially distant from the mouth portion 41, and the spigot 50 as the male part is shown axially spaced even more backward therefrom. In order to establish the fully connected state of the fluid connection system shown in FIG. 2B, the sealing means 30 is first positioned within the mouth portion 41 at the step portion 43 of the female part 40, the ring-shaped retaining means 10 is then positioned axially backwards and adjacent to the sealing means 30.

The connector already comes into a pre-locked engagement state when being inserted into the mouth portion 41. This is because the second flexing member 12 of the retaining means 10 will undergo some compression when entering the mouth portion 41 and will then snap into the recessed portion 42 of the female part 40. Thereby, the second flexing member 12 prevents the retaining means 10 and the sealing means 30 from falling out of the mouth portion 41 during transport or the like.

Finally, the male part 50 is pushed through the retaining means 10 and the sealing means 30 until the first flexing members 11 which protrude radially inwards form a snapping engagement with the recessed portion 51 of the male part 50. The ratchet formed at the backward end of the recessed portion 51 abuts against the first flexing members 11 so that the male part 50 remains locked within in the connector 10 and cannot be moved backwards anymore.

The sealing means 30 is expanded when the male part 50 is pushed through the retaining means 10 and the sealing means 30 into the fully locked position shown in present FIG. 2B. Thereby, the fluid connection system reaches a state in which the male part 50 is fully sealed against the female part 40. This is due to the fact that the most frontward portion of the male part 50 has an outer diameter which is slightly larger than the inner diameter of the sealing means 30 so that the sealing means 30 has to expand radially when the male part 50 is pushed through with its most frontward portion.

Figure 3B:
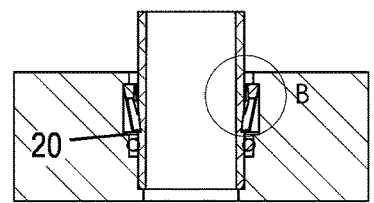
FIG. 3B a cross-sectional view of the fluid connection system components of FIG. 3A in a connected state.
Figure 3A:
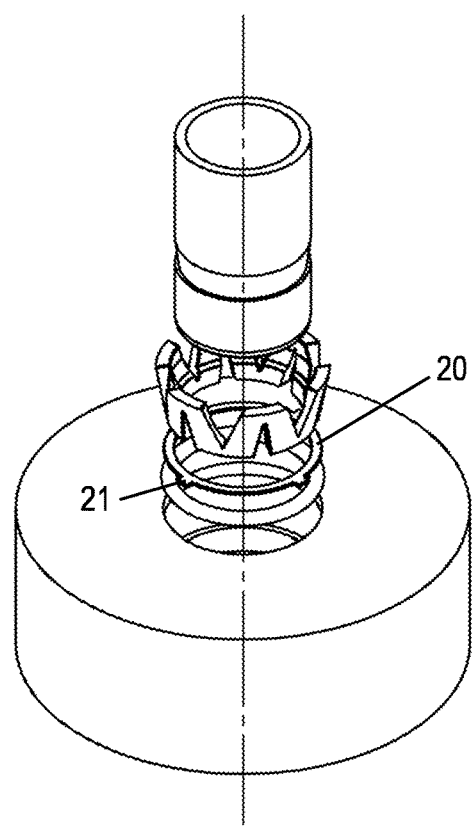
FIG. 3A a perspective exploded view of the fluid connection system according to the second embodiment of the present invention in a non-connected state.
Figure 3C:
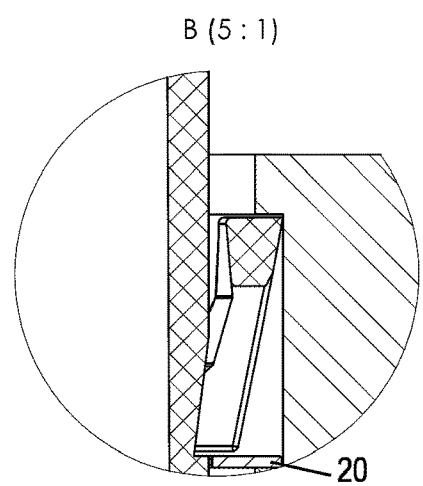
FIG. 3C an enlarged view of detail B in FIG. 3B.
Figure 4A:
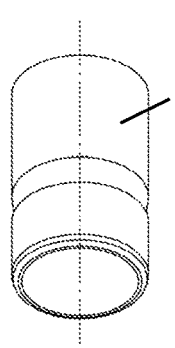
FIG. 4A a perspective view of the male part of the fluid connection system according to the present invention.
Figure 4B:
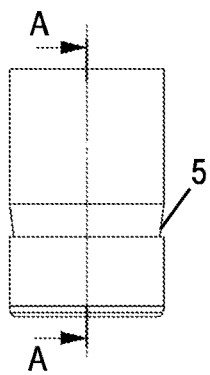
FIG. 4B a side view of the male part shown in FIG. 4A.
Figure 4C:
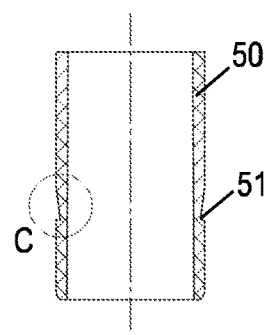
FIG. 4C a cross-sectional view taken along line A-A in FIG. 4B.
Figure 4D:
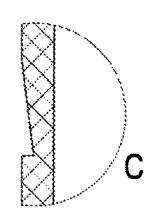
FIG. 4D an enlarged view of detail C in FIG. 4C.

FIGS. 3A-3C show the second embodiment of the present invention which distinguishes from the first embodiment shown in FIGS. 2A-2C only in that a washer 20 is positioned axially between the retainer ring 10 and the sealing means 30. Since the presence of the washer 20 forms the only distinction to the first embodiment described above, only this part will be described now and the other parts are just shown in the drawings without description and designation by reference signs.

The washer or spacer 20 rests on the frontward edge of the recessed portion 42 of the female part 40 and serves as a circumferentially uniform stopper for the sealing means 30 in the axial direction X. This is particularly important when the sealing means is radially expanded by insertion of the male part 50. The washer 20 then blocks the sealing means 30 from deforming in the axial direction. In particular, the sealing means 30 cannot enter into the notch-like gaps 14 formed between the first flexing member 11 at the lower axial end of the retainer ring 10 under pressure.

As shown in the drawings, the washer 20 has radial protrusions 21. The protrusions 21 help to position the washer 20 within the mouth portion 41 and stop the washer 20 from falling too far into the female part 40. As shown in the drawings, four protrusions 21 may be arranged circumferentially in a 4-fold symmetry. Other arrangements or numbers of protrusions are, of course, possible, as well as a washer 20 without any such protrusions 21.

After the male part 50 is inserted, the retaining means 10 may also be manipulated with a secondary latching operation (e.g., by a latching tool not shown) in the frontward direction to close the gaps 14 so as to provide a flat retainer surface towards the upper surface of the sealing means 30. Thereby, the fluid connection system comes into the fully locked and sealed state with tight and uniform compression of the sealing means 30 from both axial ends even without providing any washer 20.

Figure 5A:
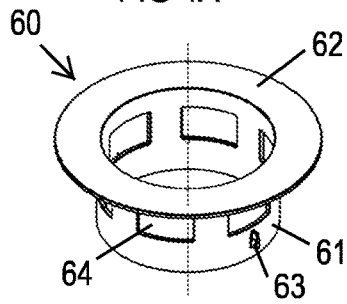
FIG. 5A a perspective view of the releasing means of the fluid connection system according to a third and fourth embodiment of the present invention.
Figure 5B:
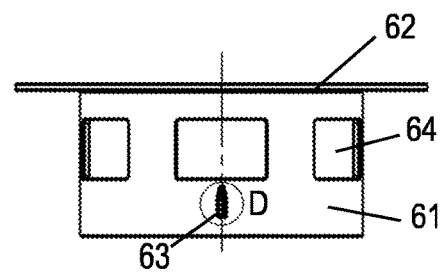
FIG. 5B a side view of the releasing means shown in FIG. 5A.
Figure 5C:
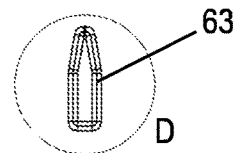
FIG. 5C an enlarged view of detail D in FIG. 5B.
Figure 6B:
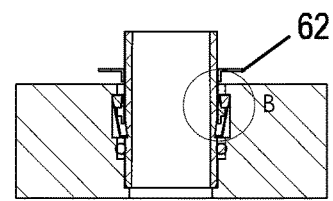
FIG. 6B a cross-sectional view of the fluid connection system components of FIG. 6A in a connected state.
Figure 6A:
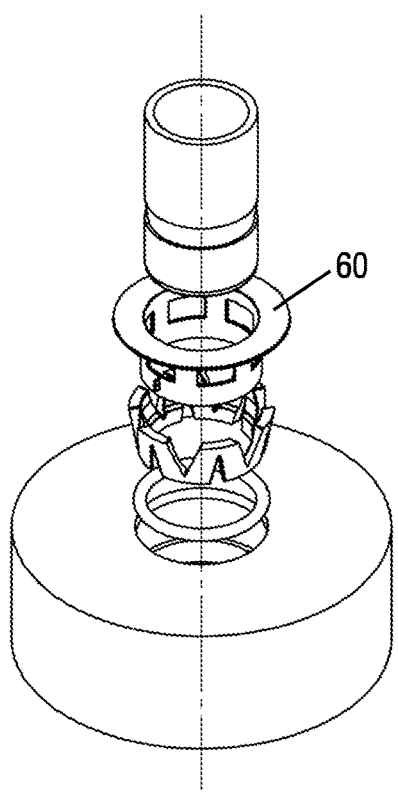
FIG. 6A a perspective exploded view of the fluid connection system according to the third embodiment of the present invention in a non-connected state.
Figure 6C:
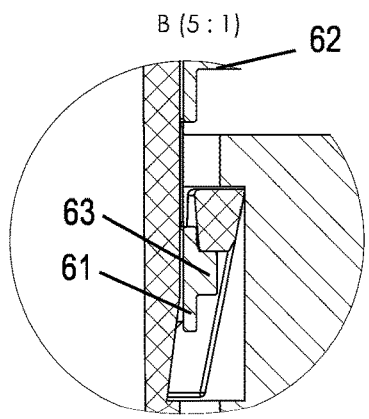
FIG. 6C an enlarged view of detail B in FIG. 6B.

FIGS. 5A-5C show releasing means 60 which may be used as a tool for unlocking the male part 50 from the snapping engagement with the first flexing members 11 of the retaining means 10. The releasing tool 60 has a ring-shaped portion 61 having a diameter which is larger than the diameter of the first axial end of the retainer ring 10 formed by the first flexing members 11 but smaller than the diameter of the second axial end of the retainer ring 10 formed by the second flexing members 12. As shown in FIGS. 6A-6C, the ring portion 61 may therefore be used to flex the first flexing members 11 radially outwards in order to release the recessed portion 51 of the male part 50 from the retainer ring 10.

The releasing means 60 further has a gripping portion 62 which is designed to remain outside the mouth portion 41 and which allows an operator to operate the releasing means 60 in order to disengage the male part 50 by a pushing operation into the frontward direction when necessary. The ring portion 61 has six windows 64 which are circumferentially positioned to correspond to the positions of the second flexing members 12 in the connected state shown in FIG. 6B. Below two diametrically opposite windows 64 the ring portion 61 has a radial protrusion 63 for engagement with the notch-like gaps 14 between two adjacent first flexing members 11 of the retainer ring 10. The number of the windows 64 and protrusions 63 may be chosen in an appropriate manner and is not limited to the shown embodiment.

As shown in FIGS. 6B and 6C, the releasing means 60 is axially positioned such that its ring portion 61 is engaged within the retainer ring 10. In particular, the wedge-like protrusions 63 are received within the lower gaps 14 and the second flexing members 12 are received within the windows 64. This means a secure and defined radial positioning of the releasing means 60 within the retainer ring 10. The axial positioning is given by the shoulder portion 16 at the inside surface of the web portions 13. The releasing tool 60 abuts and rests against these shoulder portions 16 in the relaxed and fully connected state shown in FIG. 6B.

Now, the operator can push the releasing means 60 axially frontwards by use of the gripping portion 62. The operator will feel a certain resistance against this pushing operation because the axial frontward end of the releasing means 60 is in the rest position abutting against the shoulder portions 16 of the web portions 13. When overcoming this resistance, the ring portion 61 will expand the first flexing members 11 radially outwards in order to release their engagement with the recessed portion 51 of the male part 50. As soon as the operator takes hands off, the releasing means 60 will move back into the relaxed state due to the elastic flexibility of the retaining means 10 in the radial direction.

Figure 7B:
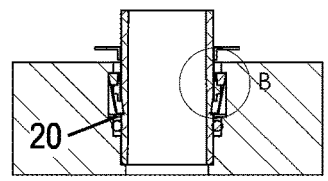
FIG. 7B a cross-sectional view of the fluid connection system components of FIG. 7A in a connected state.
Figure 7A:
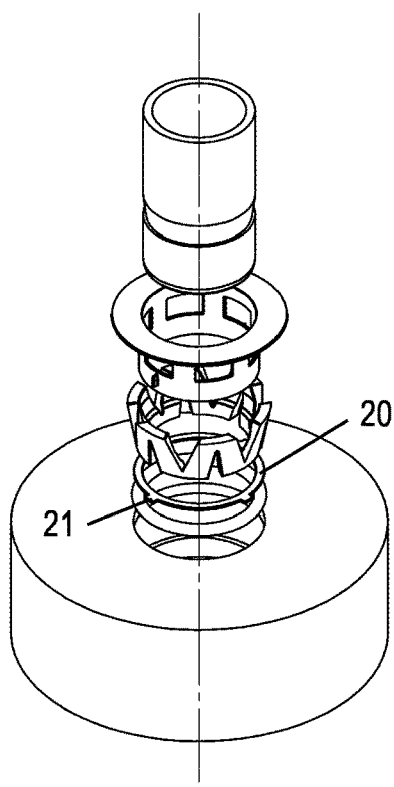
FIG. 7A a perspective exploded view of the fluid connection system according to the fourth embodiment of the present invention in a non-connected state.
Figure 7C:
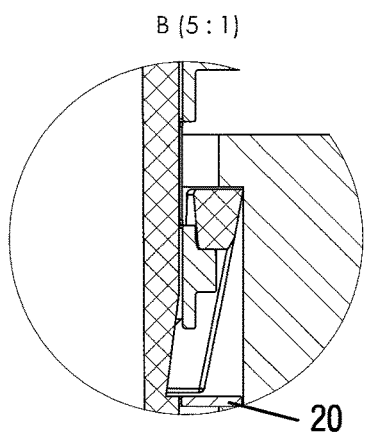
FIG. 7C an enlarged view of detail B in FIG. 7B.

FIGS. 7A-7C show the fourth embodiment of the present invention which distinguishes from the third embodiment shown in FIGS. 6A-6C only in that a washer 20 is positioned axially between the retainer ring 10 and the sealing means 30. Just as in the second embodiment, the washer or spacer 20 rests on the frontward edge of the recessed portion 42 of the female part 40 and serves as a circumferentially uniform stopper for the sealing means 30 in the axial direction X.

FIGS. 8A and 8B show another type of female part 40A to be used with a fifth embodiment of the present invention. This female part 40A is the end of a pipe or tube and not formed as a hole in a block as with the first to fourth embodiments. However, the same principles as explained with respect to the other embodiments also apply to the fifth embodiment. The female part 40A has a mouth portion 41A in which the recessed portion 42A and the step portion 43A are formed in the same way as explained further above with respect to FIGS. 2A-2B.

FIGS. 9A-9C show the use of the female part 40A in the fifth embodiment. The individual parts and their functions are the same as in the third embodiment shown in FIGS. 6A-6C except that the block-like female part 40 is replaced by the tube-like female part 40A. Hence, the description of the functionality of the parts in FIGS. 6A-6C applies mutatis mutandis to FIGS. 9A-9C.

Of course, the washer 20 could be added to the fifth embodiment similar to what is shown in FIGS. 7A-7C for embodiment 4 and/or the releasing means may be omitted from the fifth embodiment similar to what is shown in FIGS. 2A-2C and 3A-3C for embodiments 1 and 2.

In summary, the present invention provides a quick connector made of plastics material for establishing a snapping connection between a tubular male part 50 and a female part 40 of a fluid connection system. The connector has retaining means 10 adapted to be set within the mouth portion 41 of the female part 40 and having first and second flexing members 11, 12 for snapping engagement with the male part 50 and the female part 40, respectively. Each pair of circumferentially adjacent first and second flexing members 11, 12 is cross-connected by a transversal web portion 13 having a main longitudinal axis L which extends directly from the first flexing member 11 to the second flexing member 12.

The invention claimed is:

1. A quick connector for connecting a tubular male part (50) in an axial direction (X) to a female part (40; 40A), comprising:
   sealing means (30) adapted to be set within a mouth portion (41; 41A) of the female part (40; 40A) to form a seal between the male part (50) and the female part (40; 40A); and
   retaining means (10) adapted to be set within the mouth portion (41; 41A) and having at least two first flexing members (11) protruding radially inwards for snapping engagement with the male part (50) and at least two second flexing members (12) protruding radially outwards for snapping engagement with the female part (50),
   wherein each pair of circumferentially adjacent first and second flexing members (11, 12) is connected by a web portion (13) having a main longitudinal axis (L) which extends directly from the first flexing member (11) to the second flexing member (12), and wherein the web portion (13) has a tapered form so that the width of the web portion (13) reduces along the main longitudinal axis (L) from the first flexing members (11) to the second flexing members (12).

2. The quick connector of claim 1, wherein the first flexing members (11) are provided at a first axial end of the retaining means (10), and the second flexing members (12) are provided at a second axial end of the retaining means (10) which is opposite to the first axial end.

3. The quick connector of claim 2, wherein the retaining means (10) as a whole has the shape of a tapered ring whose diameter reduces from the second axial end to the first axial end, and which is provided with radial resilience by first gaps (14) provided at the first axial end between two circumferentially adjacent first flexing members (11) and second gaps (15) provided at the second axial end between two circumferentially adjacent second flexing members (12).

4. The quick connector of claim 1, wherein the web portions (13) connect the first and second flexing members (11, 12, 22) in a zig-zag shape along the circumferential direction of the retaining means (10).

5. The quick connector of claim 1, wherein the main longitudinal axis (L) of each web portion (13) forms an inclination to the axial direction (X) of the quick connector, said inclination being described by two angles>0°:
the first angle ($\alpha$) giving the amount by which the web portion (13) is inclined radially inwards from the second flexing member (12) to the first flexing member (11), and
the second angle ($\beta$) giving the amount by which the web portion (13) is inclined in a circumferential direction of the retaining means (10) from a second flexing member (12) to the circumferentially adjacent first flexing member (11).

6. The quick connector of claim 5, wherein the first angle ($\alpha$) is between 5° and 30°, and the second angle ($\beta$) is between 10° and 60°.

7. The quick connector of claim 6, wherein the first angle ($\alpha$) is between 10° and 20° and the second angle ($\beta$) is between 20° and 50°.

8. The quick connector of claim 1, wherein the first flexing members (11) and the second flexing members (12) are provided alternating with each other at circumferentially spaced portions along the circumference of the retaining means (10).

9. The quick connector of claim 1, wherein the retaining means (10) is made of plastics material and formed as an integral structural body.

10. The quick connector of claim 1, wherein the retaining means (10) is adapted to retain the sealing means (30) in a sealing position axially next to but not overlapping the retaining means (10) so that the sealing means (30) is adapted to contact both the male part (50) and the female part (40; 40A) in a locked condition of the quick connector.

11. The quick connector of claim 1, further comprising releasing means (60) which includes:

a ring portion (61) having an outer diameter which is larger than the inner diameter of the retaining means (10) at a first axial end at which the first flexing members (11) are provided but smaller than the inner diameter of the retaining means (10) at a second axial end at which the second flexing members (12) are provided; and a gripping part (62) connected to the ring portion (61) and provided axially spaced from the ring portion (61) so as to protrude from the mouth portion (41; 41A) of the female part (40; 40A), wherein the gripping part (62) allows an operator in a releasing operation to push the ring portion (61) towards the first axial end of the retaining means (10) so that the first flexing members (11) are bent in the radial direction and disengage from the male part (50).

12. The quick connector of claim 11, wherein the outer circumference of the ring portion (61) has at least one radial protrusion (63) for latching into a notch-like first gap (14) between two adjacent first flexing members (11).

13. A fluid connection system comprising:
a quick connector for connecting a tubular male part (50) in an axial direction (X) to a female part (40; 40A) that includes sealing means (30) adapted to be set within a mouth portion (41; 41A) of the female part (40; 40A) to form a seal between the male part (50) and the female part (40; 40A) and retaining means (10) adapted to be set within the mouth portion (41; 41A) and having at least two first flexing members (11) protruding radially inwards for snapping engagement with the male part (50) and at least two second flexing members (12) protruding radially outwards for snapping engagement with the female part (50), wherein each pair of circumferentially adjacent first and second flexing members (11, 12) is connected by a web portion (13) having a main longitudinal axis (L) which extends directly from the first flexing member (11) to the second flexing member (12) and wherein the web portion (13) has a tapered form so that the width of the web portion (13) reduces along the main longitudinal axis (L) from the first flexing members (11) to the second flexing members (12);
wherein the tubular male part (50) is a spigot; and
wherein the female part (40; 40A) is formed as a hole in a connector block.

14. The system of claim 13, wherein the tubular male part (50) has a recessed portion (51) having a decreased outer diameter, and the first flexing members (11) of the retaining means (10) are adapted to engage with the recessed portion (51) when the male part (50) is pushed in the axial direction (X) through the quick connector.

15. The system of claim 13, wherein the female part (40; 40A) has a recessed portion (42; 42A) formed on the periphery of its mouth portion (41; 41A), and the second flexing members (12) of the retaining means (10) are adapted to engage with the recessed portion (42; 42A) of the female part (40; 40A) when the retaining means (10) is pushed in the axial direction (X) into the female part (40; 40A).

* * * * *